United States Patent
Takai et al.

(10) Patent No.: US 8,505,740 B2
(45) Date of Patent: Aug. 13, 2013

(54) SOLID-LIQUID SEPARATOR USING ROLLER SYSTEM

(75) Inventors: Toichiro Takai, Ishikawa-gun (JP); Satoshi Ueda, Ishikawa-gun (JP); Toru Awazu, Ishikawa-gun (JP); Motonari Amano, Ishikawa-gun (JP); Kenji Kasama, Ishikawa-gun (JP); Masahiro Yoshida, Ishikawa-gun (JP); Masaaki Watanabe, Ishikawa-gun (JP)

(73) Assignee: Takai Tofu & Soymilk Equipment Co., Ishikawa-Gun, Isikawa (JP)

( * ) Notice: Subject to any disclaimer, the term of this patent is extended or adjusted under 35 U.S.C. 154(b) by 400 days.

(21) Appl. No.: 12/801,190

(22) Filed: May 27, 2010

(65) Prior Publication Data

US 2011/0108475 A1    May 12, 2011

(30) Foreign Application Priority Data

Nov. 9, 2009   (JP) .................................. 2009-255859

(51) Int. Cl.
*B01D 33/06* (2006.01)
*B01D 33/76* (2006.01)
*B30B 9/20* (2006.01)

(52) U.S. Cl.
USPC ........... 210/386; 210/398; 210/396; 210/402; 210/408; 100/121; 99/495

(58) Field of Classification Search
USPC ................. 210/386, 402–404, 396, 407, 408, 210/455, 484, 498, 499, 398; 100/104, 137, 100/121; 162/232, 281, 289, 290, 300, 301, 162/302, 323, 257, 358.1; 99/495
See application file for complete search history.

(56) References Cited

U.S. PATENT DOCUMENTS

| 1,006,990 | A | * | 10/1911 | Warren | ............................. 492/50 |
| 1,321,956 | A | * | 11/1919 | Wagner | ......................... 100/112 |
| 1,483,562 | A | * | 2/1924 | Wagner | ....................... 162/358.1 |

(Continued)

FOREIGN PATENT DOCUMENTS

| JP | 3392322 | 1/2003 |
| JP | 3417794 | 4/2003 |
| JP | 3537377 | 3/2004 |

OTHER PUBLICATIONS

English language machine translation of JP 2001-314999, pp. 1-14.*

*Primary Examiner* — David C Mellon
(74) *Attorney, Agent, or Firm* — Manabu Kanesaka

(57) ABSTRACT

A solid-liquid separator using a roller system includes a casing, rollers disposed within the casing and each provided with a screen that is formed in an outer periphery thereof with plural pores, a supply device disposed outside the rollers for supplying into the casing under appropriate pressure a solid-liquid mixture to be separated into a solid component via the plural pores and a liquid component filtered inside, a casing wall disposed adjacent to the rollers after the solid-liquid mixture supplied with the supply device is passed through the rollers rotated, a discharge window formed in the casing wall for discharging the solid component, and a pressure application lid formed on the casing wall for stably applying prescribed pressure in a direction of closing the discharge window with a pressure application device. The liquid component is separated from the solid-liquid mixture by means of the rollers and the solid component is discharged from the discharge window on which pressure has been exerted by means of the pressure application lid.

2 Claims, 7 Drawing Sheets

(56) References Cited

U.S. PATENT DOCUMENTS

| | | | |
|---|---|---|---|
| 3,468,242 A * | 9/1969 | Schaffrath | 100/121 |
| 3,863,560 A * | 2/1975 | Indelicato et al. | 100/37 |
| 4,099,393 A * | 7/1978 | Norris et al. | 68/22 R |
| 4,452,641 A * | 6/1984 | Kaether | 127/43 |
| 4,683,814 A * | 8/1987 | Plovanich et al. | 100/37 |
| 4,919,824 A * | 4/1990 | Creps et al. | 210/770 |
| 4,986,881 A * | 1/1991 | Funk | 162/56 |
| 5,107,757 A * | 4/1992 | Ohshita et al. | 100/90 |
| 5,281,343 A * | 1/1994 | Lewis et al. | 210/784 |
| 6,044,980 A * | 4/2000 | Houle | 210/396 |
| 6,668,600 B1 * | 12/2003 | Hansson | 68/43 |
| 2010/0294708 A1 * | 11/2010 | Ponten et al. | 210/236 |

\* cited by examiner

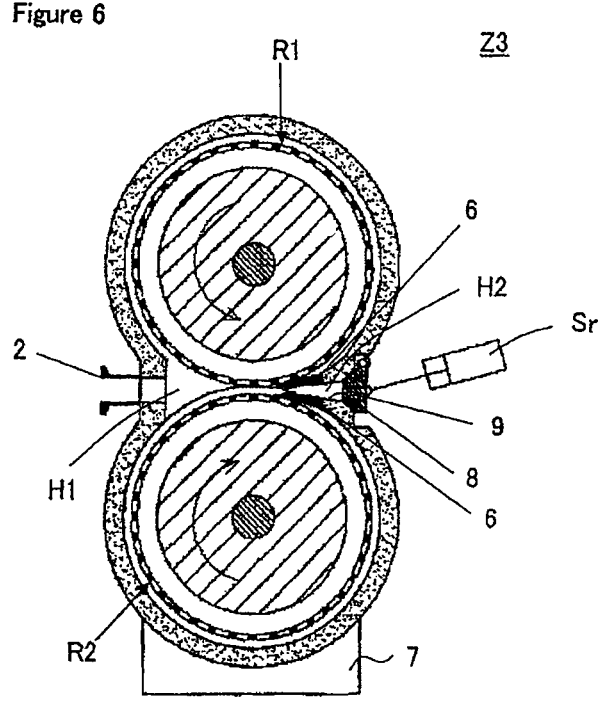

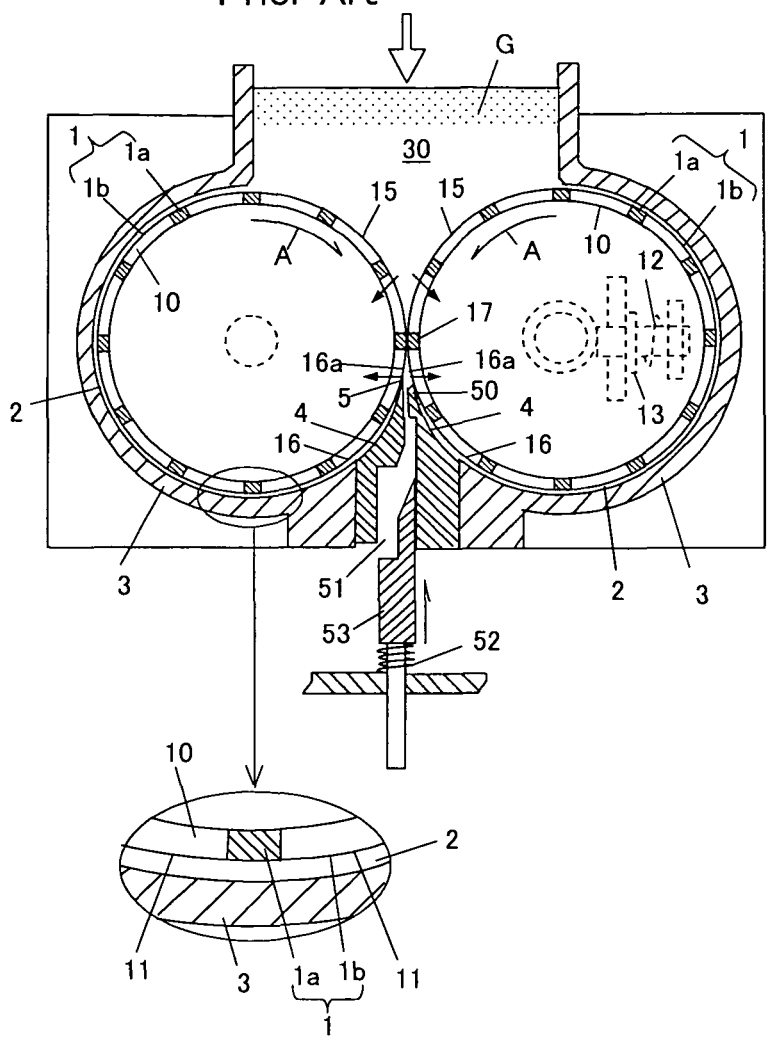

SOLID-LIQUID SEPARATOR USING ROLLER SYSTEM

RELATED APPLICATIONS

The present application is based on, and claims priority from, Japanese Application No. JP2009-255859, filed Nov. 9, 2009, the disclosure of which is hereby incorporated by reference herein in its entirety

BACKGROUND OF THE INVENTION

1. Field of the Invention

The present invention relates to a solid-liquid separator using a roller system, equipped with rollers each having a screen formed in the outer periphery thereof with plural pores, for separating a solid-liquid mixture into a solid component and a liquid component via the plural pores.

2. Description of the Prior Art

There has heretofore been known a solid-liquid mixture separator for separating liquid through filtration from a solid-liquid mixture having a solid substance and a liquid substance mixed with each other, in which cited as the solid-liquid mixture is a solid-liquid mixture (so-called "boiled soybean-water slurry" that is hereinafter referred to also as "soybean soup" in the description) as obtained through boiling of soybean slurry (so-called unheated soybean-water slurry) that has been acquired by immersing soybeans in water overnight and then scrubbing and crushing the soybeans while being added with water when manufacturing tofu or fried bean curd.

As a separator for a solid-liquid mixture, there are a screw-system one comprising a cylindrical screen having plural pores formed therein and a spiral screw driven and rotated within the cylindrical screen and a multistage-system one comprising the screw-system one and a cylindrical screen that has plural pores formed therein for gravity filtration (a screen for filtration) (Japanese Patent No. 3417794 or 3392322, for example). On the other hand, there is a roller-system one in which a solid-liquid mixture is supplied between a pair of right and left rollers facing each other, with their respective axial directions kept in parallel. Japanese Patent No. 3537377 (hereinafter referred to as "Citation 3") points out that one extraction can only be attained with the pair of rollers and performs squeezing with the pair of rollers (primary extraction) the solid-liquid mixture (soybean soup) supplied from above the pair of rollers and squeezing, with the lower surfaces of the rollers and a retention portion (secondary extraction), okara received on the retention portion with which an extraction passageway formed so that the amount to be discharged may be smaller than the amount to be received communicates. In the embodiment of Citation 3, as shown in FIG. 11, the retention portion 5 for okara (a solid substance) is formed so as to be surrounded by the pair of rollers 1, scrapers 4 for scraping the solid component adhering to the rollers, and opposing lower side surface portions 16a extending from opposing central portions 17 of the rollers 1 to the scrapers 4 and, at this retention portion 5, a squeezing passageway 50 having a passageway narrowed so that the amount to be discharged may be smaller than the amount to be received for giving squeezing pressure to the retained okara is formed. Incidentally, the squeezing passageway 50 has a discharge outlet 51 provided with a lid body 53 biased with a spring 52 in the direction of closing the discharge outlet 51. The lid body 53 enables the opening area of the discharge outlet 51 to be varied in accordance with the internal pressure of the retention portion 5.

While the solid-liquid separator using the roller system has the advantage of making it possible to treat a great mount of a solid-liquid mixture in a short period of time, the system capable of acquiring high-quality soymilk from soybean soup is the gravity filtration system disclosed as an appropriate system in Japanese Patent No. 3417794 or 3392322 concurrently using a gravity filtration portion. An ordinary solid-liquid separator using the roller system generally performs the extracting treatment by the use of the pair of rollers. Though Citation 3 also performs the extracting treatment using the pair of rollers, it performs filtration (dehydration or squeezing) under strong pressure at positions between the pair of rollers and below them in the presence of the retention portion 5 and squeezing passageway 50.

In Citation 3, however, though it is intended that the pair of rollers are used to squeeze (primarily extract) the solid-liquid mixture (soybean soup) and that a solid component (okara) received on the retention portion, with which the squeezing passageway formed so that the amount to be discharged may be smaller than the amount to be received (i.e. interpreted in Citation 3 as a structure in which the cross-sectional area of the outlet is narrowed to be smaller than that of the inlet of the passageway) communicates, is subjected to secondary extraction with the lower surfaces of the rollers and retention portion, the flow rates of the liquid component (soymilk) and the solid component (okara) fluctuate in accordance with the state of variation in viscosity of the soybean soup, resulting in fluctuation in internal pressure and, in accordance with it, resulting in a variation in the degree of extraction of okara and in the quality of soymilk. It is necessary that the degree of squeezing of the squeezing passageway be set to be optimum for the concentration and product of the solid-liquid mixture and, depending on a case, closure or clogging may possibly be induced. In addition, in order to appropriately perform the primary and secondary extractions, it is necessary to adjust the rotation speed of the rollers, adjust the set positions between the paired rollers 1 and the scrapers 4 constituting the retention portion 5 and narrowing the passageway so that the amount to be discharged be smaller than that to be received. These settings and adjustments are also difficult to perform. The degree of squeezing of the squeezing passageway corresponds to the degree of internal pressure and, though it is necessary in nature to set optimum degrees depending on the solid-liquid mixture (concentration, viscosity, etc.) or the product (tofu or fried bean curd), problems have been entailed in that the fixed degree of squeezing has made it difficult to exchange a product, that a large content of a residue to be mixed therein has made the quality of the fried bean curd worse and, as the case may be, closure or clogging has arisen. Incidentally, though the discharge outlet 51 of the squeezing passageway 50 is provided with the lid body 53 biased with the spring 52 in the direction of closing the discharge outlet 51, a cumbersome labor of interchanging springs has been required in the case where a different degree of squeezing is to be set depending on a difference in product (between tofu and fried bean curd, for example) and, since the position of the spring to be attached is deep in the lower side of the apparatus, visual contact, gap adjustment (measurement) or cleaning working has been difficult to perform. These are faults. An additional fault has lain in that a mistake made in attaching or detaching the lid body 53 possibly mars the expensive screen of the roller. Citation 3 merely discloses in the figure thereof that the lid body is wedge-shaped and no detailed description on the disposition thereof is made therein (there is no description therein as to whether the lid body can fully be closed or as to the cleaning property thereof). Incidentally, since the lid body is made slender and wedge-shaped and since the aperture of the narrow discharge outlet is adjusted, it is possible to exert appropriate internal pressure even with a spring having a small spring coefficient. The actual tendency, however, is to exert more internal pressure than necessary, thereby increasing the amount of the residue to be mixed in soymilk to possibly entail a problem of deteriorating the quality of products.

Even in a conventional ordinary roller-system solid-liquid separator, the properties (fluctuation in water content resulting from the degree of pressure to be exerted) of the solid component (okara) to be discharged always vary depending on the rotation speed of the rotary rollers, configuration of the rollers (a difference in size among the plural pores), ratio of the solid content in the solid-liquid mixture, concentration of the liquid content, etc. However, this does not result in complete separation of the liquid component by desirable homogenous filtration, but induces a difference in amount of a minute solid substance (residue in the case of soymilk) in the liquid component and a change in higher-order structure and emulsified state of a polymer (protein etc.) in the components to affect the quality of products more or less. Though it has been known in the tofu industrial field that fried bean curd or deep-fried tofu produced from strongly extracted soymilk has, through experiences, turned red to thus induce product inferiority, this fails to stably separate the liquid component (soymilk) of desirable high quality through homogenous filtration.

In view of the above, the object of the present invention is to provide a solid-liquid separator using a roller system, which is capable of stably separating a solid-liquid mixture into a solid component and a liquid component at all times under homogeneous pressure without being affected by a change in internal pressure resulting from fluctuations in the amount of the solid-liquid mixture to be supplied and in the viscosity of the solid-liquid mixture and which is difficult to clog by a solid substance, easy to adjust the degree of squeezing and easy to perform cleaning working.

SUMMARY OF THE INVENTION

To attain the above object, according to the present invention, there is provided a solid-liquid separator using a roller system, comprising a casing, rollers disposed within the casing and each provided with a screen that is formed in an outer periphery thereof with plural pores, supply means, including a pump, disposed outside the rollers for supplying into the casing under appropriate pressure a solid-liquid mixture to be separated into a solid component via the plural pores and a liquid component filtered inside, a casing wall disposed adjacent to the rollers after the solid-liquid mixture supplied with the supply means is passed through the rollers rotated, a discharge window formed in the casing wall for discharging the solid component, and a pressure application lid formed on the casing wall for stably applying prescribed pressure in a direction of closing the discharge window with pressure application means, whereby the liquid component is separated from the solid-liquid mixture by means of the rollers and the solid component is discharged from the discharge window on which pressure has been exerted by means of the pressure application lid.

The present invention also provides a solid-liquid separator using a roller system, comprising a casing, plural rollers which are disposed within the casing and at least one of which is provided with a screen that is formed in an outer periphery thereof with plural pores to function as a roller for filtration, supply means, including a pump, disposed outside the rollers for supplying into the casing under appropriate pressure a solid-liquid mixture to be separated into a solid component via the plural pores and a liquid component filtered inside, a casing wall disposed adjacent to the rollers after the solid-liquid mixture supplied with the supply means is passed through the rollers rotated, a discharge window formed in the casing wall for discharging the solid component, and a pressure application lid formed on the casing wall for stably applying prescribed pressure in a direction of closing the discharge window with pressure application means, whereby the liquid component is separated from the solid-liquid mixture by means of the rollers and the solid component is discharged from the discharge window on which pressure has been exerted by means of the pressure application lid.

Here, though the supply means for the solid-liquid mixture may adopt a self-weight system (drop system), since this type induces ready fluctuation in forcing pressure depending on the level (height) thereof, the supply means adopting a pump system is preferred. Raised as the pump system are qualitative pumps including a gear pump, a rotary pump and a NEMO pump, centrifugal pumps, or other pumps capable of acquiring discharge pressure of 0.001 to 0.5 MPa, preferably 0.002 to 0.2 MPa. These pumps have to be adjusted so as to balance the speed of filtration of the liquid component by the rollers and the speed of discharge of the solid substance. Though this adjustment may be made manually, automatic adjustment utilizing a pressure sensor or converter is preferred. It is still preferable to use the above in combination with an indicating controller or an indicator, or other such device. In the case of a pump exhibiting unduly high discharge pressure, there is a possibility of the solid-liquid mixture being leaked from gaps other than the filtration surface or of the screen that is the filtration surface being loaded greatly and damaged.

According to the present invention, since the discharge window is in a state of being homogenously pressurized with the pressure application lid when the solid-liquid mixture has been supplied, a solid component kept in a homogenously pressurized state (a solid component having a substantially constant water content ratio) is discharged and, within the casing, a liquid component of homogeneous quality is filtered with the rollers.

When making the description on condition that the solid-liquid mixture is soybean soup for producing tofu, fried bean curd and the like, that the solid component is okara and that the liquid component is soymilk, since the pressure application lid keeps the pressure constant irrespective of the concentration or viscosity of the soybean soup or of the fluctuation of the residue, okara having the squeezing degree kept constant is discharged from the discharge window and, within the casing, soymilk having a homogenous concentration and a preferable quality (having a protein high-level structure and an emulsified state retained and containing a small amount of residue) is separated with the rollers. In addition, mere adjustment of the pressure to be exerted on the pressure application lid enables the degree of extraction of the solid component to be simply adjusted at a moment even during the operation. Furthermore, in the present invention, the passageway can fully be closed from one side between the paired rollers and the pressure application means is kept substantially constant and stable with the air pressure, thereby making the water content of okara constant. Since the retention portion has a constant volume, may have a passageway for it or a squeezing passageway wider gradually toward the discharge window, and is difficult to close, it can handle various properties of the solid substance.

Particularly, since the pressure application lid is attached to and disposed on the outer side of the casing, the visual contact, adjustment and cleaning working are easy to perform.

When performing automatic circulation cleaning, such as CIP cleaning, it is preferred that the pressure application lid can fully close the discharge window even in the presence of the solid substance, uses packing so as to form a sealed state inducing no liquid leakage and exhibits high sealability with a metal-to-metal touch. Furthermore, the pressure application lid may preferably have a wedge-shape structure so as to enable the sealability to be secured even in the presence of the solid substance and have a configuration capable of heightening the fitting or plane accuracy. Moreover, by adopting a structure neither damaged by pressure nor narrowed so that the retention portion or passageway from the scraper to the front of the discharge window may be made wider toward the discharge side even in parallel thereto, the solid component can smoothly be discharged to make it possible to avoid closure by the solid component and heighten the cleaning property.

The pressure application means is not limited to a spring, an air cylinder or a weight, but is preferably an air-pressure, oil-pressure or water-pressure cylinder because it can provide a constant and stable load at all times, easily set by numerals a wide range of load adjustment and exhibit high reproducibility.

The present invention further provides as another aspect thereof a solid-liquid separator using a roller system, wherein the rollers have roller shafts disposed in parallel to one another and are paired in the form of the first (upper) roller and the second (lower) roller, the solid-liquid mixture is supplied from one side between the first roller and the second roller, and the discharge window is disposed on the other side between the first roller and the second roller. That is to say, the two rollers can be applied to the pair of rollers irrespective of whether the direction of the shafts of the rollers is horizontal or vertical. In particular, the pair of right and left rollers having the shafts thereof directed vertically or the pair of upper and lower rollers having the shafts thereof directed horizontally can attain saved spacing, makes the periphery of the discharge outlet easy to visually confirm and is preferred from the standpoint of adjusting and inspection operations. The case of the pair of rollers having the shafts thereof directed horizontally is preferred from the standpoint of detaching the rollers. Therefore, it can be said that the case of the pair of upper and lower rollers having the shafts thereof directed horizontally is most preferable. It can be said that the case of the pair of rollers having the shafts thereof directed horizontally and disposed, one upward aslant and the other downward aslant (having uneven parallel shafts), is comparatively preferable. When the roller system comprises three or more rollers, it includes the case where the solid-liquid mixture is supplied to a supply area H1 between the two rollers disposed closest to the supply side and where the discharge window is disposed in a discharge area H2 between the two rollers disposed closest to the discharge window (refer to FIGS. 7(a), 7(b) and 7(c)). By disposing the direction of the shafts of the rollers aslant rather than horizontally, it is possible to facilitate discharging the liquid component and air in the rollers. When making the air discharge from inside the rollers preferential, it is better to direct the shafts of the rollers vertically and the outlet for the liquid component upward.

According to the present invention, when supplying the solid-liquid mixture into the casing, it is allowed to pass between the pair of upper and lower rollers, or right and left rollers, to discharge the solid component from the discharge window disposed at a position immediately after exertion of the pressure by the pair of rollers (or within the area H2 on the discharge side). For example, the discharge window is preferably disposed in a tangential direction of the outer periphery of the rollers and at a position close to the rollers. That is to say, by adjusting the amount of the solid-liquid mixture to be supplied, it is made possible to discharge the solid component containing a constant amount of water from the discharge window.

The present invention further provides as another aspect thereof a solid-liquid separator using a roller system, wherein the rollers are paired in the form of the first (upper) roller and the second lower) roller disposed vertically, the casing wall is formed accurately along a circumferential shape of each roller, and the discharge window is formed in the casing wall disposed between the first roller and the second roller.

According to the present invention, since the casing wall is formed arcuately along the circumferential shape of the roller, it is possible to dispose the member of the discharge outlet (pressure application lid) in the vicinity of the portion opposite to the rollers to materialize apparatus miniaturization. Since the pressure application lid is made closer to the portion opposite to the rollers, it becomes easy to exert the rotation force of the rollers onto the solid-liquid mixture and, at the same time, the solid component in a state of being exerted by the protruding pressure immediately after being passed through the rollers can be discharged out of the discharge window. Incidentally, by disposing the supply inlet for the solid-liquid mixture at a position opposite to the position of the discharge outlet, it is desirable for the supplied solid-liquid mixture to be immediately sent to the portion opposite to the rollers and protruded toward the discharge outlet along the flow direction.

Incidentally, the number and disposition of the rollers are variously conceivable. The number of the rollers may be singular, even or uneven and, when it is three, for example, the three rollers may be disposed zigzag (refer to FIGS. 7(a), 7(b) and 7(c)).

According to the present invention, the solid-liquid mixture is supplied in a state of being appropriately pressurized by the supply means and, at the same time, the solid component is discharged from the gap between the pressure application lid and the discharge window disposed on the other side between the paired rollers out of the discharge window. With this configuration, it is possible to easily discharge the solid component containing a constant amount of water out of the discharge window, even when the amount of the solid-liquid mixture to be supplied is optionally changed, without taking notice of the rotation speed of the rollers, the ratio of the solid component in the solid-liquid mixture and the concentration of the liquid component as has heretofore been done. With this simple configuration, it is possible to discharge the solid component having a constant quality (water content) out of the discharge window and, at the same time, mere adjustment of the pressure to be exerted onto the pressure application lid by means of the pressure application means enables the degree of squeezing of the solid component to be simply adjusted at a moment even during the operation. In addition, with this simple structure, it is possible to treat a great deal of the solid-liquid mixture for a short period of time without inducing clogging. Furthermore, by using the pressure application lid and disposing packing between the pressure application lid and the discharge window, it is easy to bring the interior of the casing to a fully closed state and to perform automatic circulation cleaning. That is to say, it is possible to treat a great deal of the solid-liquid mixture for a short period of time and becomes easy to perform cleaning.

The above and other objects, characteristic features and advantages of the present invention will become apparent to those skilled in the art from the description to be given herein below with reference to the accompanying drawings.

BRIEF DESCRIPTION OF THE DRAWINGS

FIG. 6 is a cross section showing a solid-liquid separator using a roller system according to the second embodiment of the present invention.

FIG. 11 is a cross section showing an example of a conventional solid-liquid separator.

DETAILED DESCRIPTION OF THE PREFERRED EMBODIMENTS

The solid-liquid separator using a roller system according to the embodiment of the present invention will be described in detail with reference to the drawings.

Figure 1:
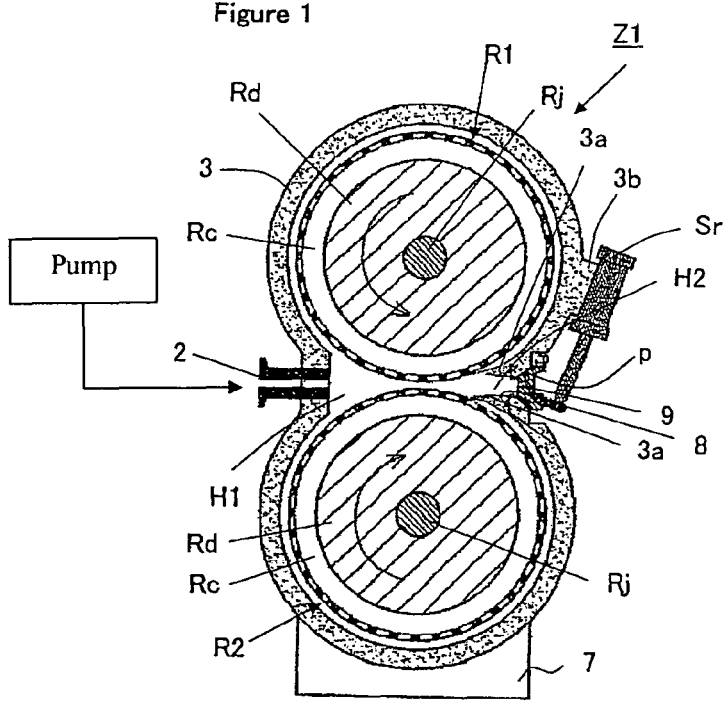
FIG. 1 is a cross section showing a solid-liquid separator using a roller system according to the first embodiment of the present invention.
Figure 2:
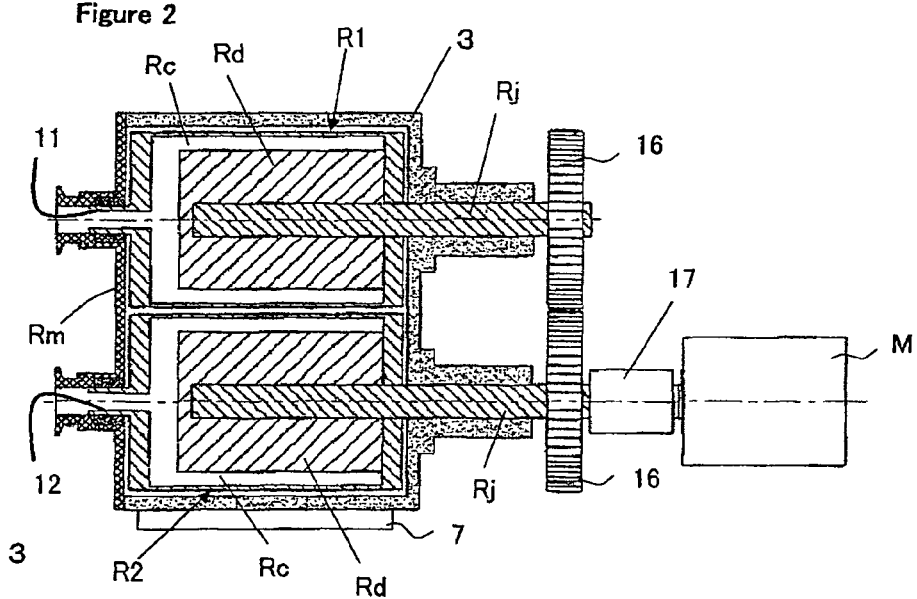
FIG. 2 is a cross section showing upper and lower rollers and a derive mechanism according to the first embodiment.
Figure 3A:
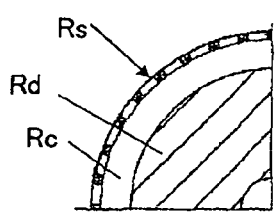
FIG. 3(a) an enlarged cross section illustrating each of the rollers and FIG. 3(b) an enlarged side view illustrating each of the rollers
Figure 3B:
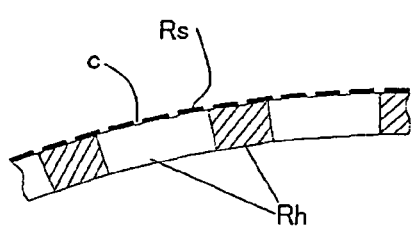
Figure 4:
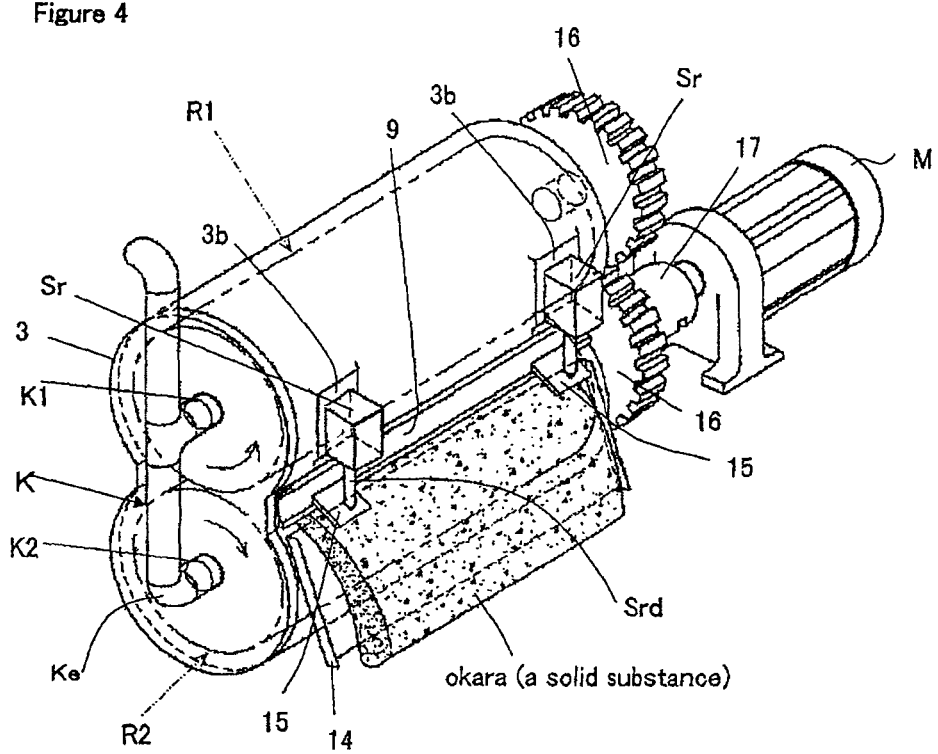
FIG. 4 is a perspective view showing the first embodiment.

FIG. 1 is a cross section showing a solid-liquid separator Z1 using a roller system according to the embodiment of the present invention. FIG. 4 is a perspective view thereof. FIG. 2 is a cross section illustrating rollers R1 and R2 and their drive mechanism in the solid-liquid separator Z1. FIG. 3 includes a side view illustrating the configuration of the rollers R1 and R2 in FIG. 1.

The solid-liquid separator Z1 using the roller system according to the present embodiment is applied for the purpose of separating soybean soup (a solid-liquid mixture) into okara (a solid component) and soymilk (a liquid component) in producing tofu and fried bean curd and comprises a base 7, a main body (casing) 3 formed in the shape of a numeral 8 and attached to the base 7, a first roller R1 incorporated into the upper circle of the numeral 8 and a second roller R2 incorporated into the lower circle of the numeral 8. The casing 3 formed in the shape of the numeral 8 in cross section is provided at the center thereof (on the left side in FIG. 1) with a supply inlet 2 for supplying the soybean soup (solid-liquid mixture) while maintaining appropriate discharge pressure (0.005 to 0.05 MPa), with the amount of the supplied soybean soup adjusted with a centrifugal pump and at the center (on the right side in FIG. 1) on the outside thereof with a discharge window 8 for discharging the soybean soup (a solid-liquid mixture).

The paired rollers R1 and R2 are cylindrical rollers disposed vertically so that their axial directions may be in parallel to each other. The pair of rollers R1 and R2 have respective rotation shafts Rj that are driven with a motor M via a coupling 17 and connected to each other with a gear wheel 16 and synchronously rotated. As rotary bearings for fixing the rotation shafts Rj, ordinary sliding bearings made of resin are adopted. Therefore, detachment of front lids Rm disposed in front of the rollers R1 and R2 and that of the rollers R1 and R2 require no particular professional knowledge, and the maintenance thereof can be accomplished with ease. In addition, since cleaning after the decomposition of the separator can be attained, the separator satisfies the factor food machinery requires. Incidentally, in the case of using two or more rollers, the peripheral speeds thereof are preferably the same. However, the peripheral speeds may differ from each other. In this case, the effect of a grater is positively made use of to induce secondary pulverization, thereby making it possible to reduce the solid content and aim at the effect of enhancing the ratio of the solid content moved to the liquid content, such as the effect of enhancing the concentration of soymilk. Similarly, in the case of enhancing the effect of a grater, it is adopted to increase the number of roller revolutions, decrease the amount to be fed by the pump, use a fixed member as one of the rollers, strengthen the application of pressure by the pressure application lid and, as occasion demands, combine these actions.

Each of the paired rollers R1 and R2 is formed through overlapping of a screen Rs and a punching plate (reinforcing plate) Rh (FIG. 3). The screen Rs is disposed on the outer peripheral surface of each of the rollers R1 and R2 and formed therein over substantially the entire surface thereof with a great number of pores c. Soymilk extracted from soybean soup is passed through the pores c and then recovered from outlets 11 and 12 formed in the end faces of the paired rollers R1 and R2. The punching plate Rh is disposed inside the screen Rs and serves to support the shape of the screen Rs and reinforce the screen Rs. An inside drum Rd is disposed inside the punching plate Rh and provided with a passageway Rc so as to efficiently lead the soymilk to the outlets 11 and 12. The inside drum Rd is provided to reduce an inside hollow portion of each of the upper and lower rollers R1 and R2, made of metal (stainless steel, titanium) or resin, readily eliminate the air within the apparatus at the time the liquid component flows into the rollers and is discharged from the outlets 11 and 12 and, at the same time, prevents the liquid component from being disturbed and foamed within the rollers R1 and R2 and moreover reduces the liquid component remaining within the rollers R1 and R2. Incidentally, the inside drum Rd may be formed in the shape of a sealed void or hollow portion and made of titanium or resin for the purpose of reducing the weight thereof. The liquid component that has passed through the screen Rs and has been separated passes through liquid component passageways Rc formed in the presence of the inside drums Rd and in the shape of the letter "U" in cross section and are discharged from the outlets 11 and 12. However, by once setting up continuous pipes from the outlets 11 and 12 (FIG. 4), it is possible to perform filtration, dehydration and squeezing, with the inside of the upper and lower rollers R1 and R2 filled with the liquid component and, as a result, soymilk can be filtered without being foamed and, at the same time, since the surface of the screen is not exposed to air, clogging by the skin of soybean milk becomes hard to induce and a defoaming operation to defoam and foam-suppressing operation can be expected so as to also enable a long-time operation. Incidentally, it is possible to connect a suction pump or deaerator to the outlets 11 and 12. In addition, treated liquid obtained as separated from the first roller R1 and treated liquid obtained as separated from the second roller R2 may be discharged separately to the exterior or may be mixed and then discharged. Furthermore, the rollers may be vertically disposed right and left in parallel to each other and an extraction device having two such rollers may be adopted. Moreover, the position of each of the outlets 11 and 12 is not limited to the center of the passageway Rc U-shaped in cross section, but may be at any position of the passageway Rc.

The first and second rollers R1 and R2 have the same size and are rotated at the same speed. While the pores c of the screens Rs of the first and second rollers R1 and R2 are the same in size and number, the sizes and numbers thereof may be different. Incidentally, it will suffice that at least one of the pair of rollers R1 and R2 is provided with a great number of pores c. Both the rollers R1 and R2 are not necessarily provided with the pores c. In addition, in the present embodiment, the first roller R1 is rotated from upward to downward and the second roller R2 from downward to upward. The solid-liquid mixture is filtered through stepwise application of pressure thereto including a primary extraction between the first and second rollers R1 and R2, i.e. in a prescribed region (region on the supply side) H1, a secondary extraction at a shortest distance portion between the rollers R1 and R2 and a tertiary extraction in a prescribed region (region on the discharge side) H2 and, in this configuration, the solid substance is simultaneously discharged from the discharge window 8 immediately after the liquid component is filtered onto the inside passageway Rc via the screens Rs of the rollers R1 and R2. The configuration of increasing the internal pressure stepwise has an effect of preventing the solid component from re-absorbing the liquid component in the inside passageway Rc via the screen Rs. In particular, the prescribed region (region on the discharge side) H2 is filled with the solid substance, the internal pressure up to the discharge window 8 provided with a pressure application lid 9 is homogenous, the re-absorption of the liquid component via the screen Rs is difficult to induce, there is a cushioning effect by the elasticity of the solid component in the region H2, and the liquid component containing a small amount of minute solid components is easy to obtain without forcibly urging the solid component against the screen Rs.

Since the rollers R1 and R2 do not come into contact with each other, gives a slight degree of pressure to the solid component to assist filtration of the liquid component and, at the same time, gives a propulsive force to the solid substance to move toward the discharge outlet, these are disposed at an interval of 0.1 to 5 mm. The interval is preferably in the range of 0.5 to 2 mm particularly for soymilk. When the interval is unduly narrow, while the solid component has a small water content ratio, and the ability to treat the solid component is lowered to form a liquid component containing a large quantity of minute solid components through forcible squeezing. When the interval is unduly wide, inversely, since a liquid component containing a small amount of minute solid components is obtained, the propulsive force of the solid substance cannot be obtained and the internal pressure of the prescribed region (region on the discharge side) H2 is not particularly heightened to lower the ability to treat the solid component, make the water content ratio of the solid substance high and induce clogging as the case may be.

To be specific, the supply inlet 2 for the solid-liquid mixture is disposed between the first and second rollers R1 and R2 and at a position shaped arcuately at the center of the casing outer wall in the shape of the numeral 8, and it is configured that the rotation force of the rollers becomes a propulsive force for the solid component most efficiently straightforward via the pair of the rollers R1 and R2 and that the solid component is discharged from the discharge window 8 disposed opposite to the casing outer wall in the shape of the numeral 8. Incidentally, it is optional whether the rotation speed of the first roller R1 is slower or rapider than that of the second roller R2. In addition, in the case where two or more stages of rollers are present, it is unnecessary that all the rollers have the same diameter and that all the rollers are provided with screens having pores. The rollers may be rubber rollers (with patterns) or metal rollers. The peripheral speeds (numbers of revolutions) of the rollers may be the same as or different from each other. Even with this configuration, the solid component (okara) having a constant water content ratio is discharged from the discharge window 8.

By using the same peripheral speed for the paired rollers and the number of revolutions thereof required to be basic, slippage between the solid substance and the rollers is reduced to bring about an effect of suppressing the minute solid component (residue in the case of soymilk) from being generated. By changing the peripheral speeds of the rollers and making the peripheral speeds higher than necessary, an effect of finely pulverizing the solid substance, like a "grater", by means of the screens having pores is brought about, thereby allowing the liquid component to contain a great deal of fine solid substances and enabling the ratio of extraction from the solid substance to be heightened. In the case of soymilk, there are cases in which a quality rich in fiber can be obtained, the amount of soymilk containing the same concentration can be increased and the yield of tofu products is also increased by about 10 to 30%. Incidentally, though the size and number of the pores c in the screen Rs are optional, when the screen is for soymilk, the pores have a diameter in the range of 0.01 to 1.0 mm and are disposed preferably at pitches of 0.03 to 3 mm on the contact surface of the solid-liquid mixture, for example. Though the shape thereof may be any of circular, oblong and rectangular shapes, it does not matter when the maximum opening distance falls within the above range. In relation to foods and drinks including soymilk, a smaller distance than the above range deteriorates the ability, whereas a larger distance than the above range increases the amount of minute solid components to affect the feeling on the tongue and induce tasting bad going down and rough feeling. In the case of soymilk for tofu or beverage, the diameter of the pores is preferably in the range of 0.02 to 0.2 mm and the pitches thereof are preferably in the range of 0.05 to 2 mm.

Figure 5:
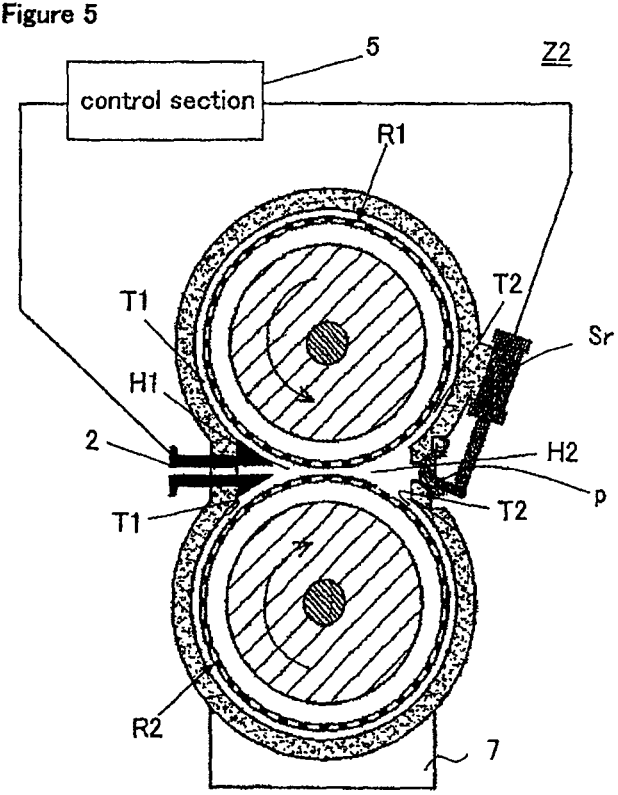
FIG. 5 is a cross section illustrating another example of the first embodiment.

In the present embodiment, the prescribed region (region on the supply side) H1 that is substantially triangular-shaped (delta-shaped) in cross section and defined by the pair of rollers R1 and R2 and the supply inlet 2 from which the solid-liquid mixture is to be supplied is set to be narrower than the prescribed region (region on the discharge side) H2 that is substantially triangular-shaped (delta-shaped) in cross section and defined by the pair of rollers R1 and R2 and the discharge window 8 (FIG. 5). In the configuration of the present embodiment, the solid-liquid mixture supplied is urged against the discharge window 8 in the passageway (protruded just from the front surface and discharged). Since the pressure application lid 9 is disposed on the discharge window 8 by means of a cylinder Sr that is pressure application means, even when the solid-liquid mixture urged against the discharge window 8 collides on the discharge window 8, it is not immediately discharged, but a solid component (okara) containing a prescribed amount of water is discharged. In this case, the water content of the solid component (okara) to be discharged is substantially homogeneous without being changed owing to the rotation speeds of the first and second rollers R1 and R2 and the concentration of soybean soup that is the solid-liquid mixture. Incidentally, while a scraper for scraping solid components (okara and residue) adhering to the screens Rs of the first and second rollers R1 and R2 may be disposed at any position on the outer peripheries of the first and second rollers R1 and R2, it is not disposed at least in the region H2 on the discharge side in the present embodiment, but a tip portion 3a of the casing 3 is disposed adjacent to the outer peripheral surfaces of the first and second rollers R1 and R2 (FIG. 1).

The pressure application lid 9 fulfills its function relative to the discharge window 8 upon being pressurized by the pressure application means and, by the cylinder Sr that is the pressure application means, the discharge window 8 is covered with the lid with the constant pressure applied. The pressure application lid 9 is of a one-side open type, with the upper side kept fixed and the lower side openable and closable. The cylinder Sr is fixed to a fixing base 3b provided on the outer periphery of the casing 3 at which the upper roller R1 is disposed, and a rod Srd of the cylinder Sr applies pressure, via a depressing plate 15 attached to the outside of the pressure application lid 9, in the direction of closing the discharge window 8. The depressing plate is attached to the pressure application lid 9 and made movable by the rod Srd of the cylinder Sr. Since the solid component is discharged from the lower side along the outer wall of the casing 3 in the one-side open type, the solid component is prevented from adhering to the cylinder Sr. In addition, since the one side is kept fixed, the discharge window 8 is not rackety to enable a stably pressurized state to be obtained. The present embodiment is provided with one or two cylinders Sr that are pressure application means (FIG. 4). In addition, the casing is provided on the lower side thereof with a chute 14 for discharging okara from it. Incidentally, it is also possible to discharge okara along the outer circumference of the lower roller R2 and along the outer circumferential circular shape (bent surface) of the casing disposed outside the lower roller without disposing the chute 14.

In addition, in order to firmly close the pressure application lid 9 and the discharge window 8 so as not to leak the liquid (liquid component), it is effective to fit in packing p on the pressure application lid side or discharge window side (FIG. 1). Furthermore, in order to prevent cleaning liquid from leaking during a cleaning operation, it is effective that the packing p is fitted in. Incidentally, in the prior art (FIG. 11), even if tight closure should be attained with a lid body 53, the operation of cleaning a conveying passageway for the solid component disposed on the lower side is very difficult to make.

The amount of the solid-liquid mixture to be supplied and the pressure application means Sr for pressurizing the pressure application lid 9 are preferably made controllable with a control section 5 as shown in FIG. 5. That is to say, though the degree of squeezing is adjusted by a constant pressure control having the pressure application lid 9 provided with constant pressure adjustment means, this is for the purpose of easily changing the pressure application of the pressure application lid 9 depending on the state and amount of the solid-liquid mixture to be supplied even during the operation through enabling the value of air pressure supplied with the air cylinder Sr that is the pressure application means to be adjustable depending on the amount of the solid-liquid mixture to be supplied. In the case where it is necessary to switch over the degree of squeezing every one product, such as tofu and fried bean curd, a system capable of setting numerical values can be designed with ease.

Next, the operation of the solid-liquid separator having a roller system according to the present embodiment will be described citing the case where soymilk is produced from soybean soup. First, when soybean soup that is a solid-liquid mixture having soybeans immersed in water overnight, pulverized while being added with water and boiled has been supplied from the supply inlet 2, it passes between the pair of upper and lower rollers R1 and R2, thereby separating the liquid substance from the soybean soup via the pores c formed in the screens Rs disposed on the outer peripheries of the rollers. Incidentally, while the soybean soup may be introduced through self-weight supply using a hopper, it is preferably supplied under prescribed pressure into the supply inlet 2 with a pump. This is because the self-weight supply little induces filtration in the region H1 on the supply side and, since the force of urging the solid component toward the discharge outlet depends greatly on the rotation force of the rollers, the phenomenon of a "grater" occurs to facilitate acquisition of the liquid component having minute solid components mixed therewith. The present invention utilizes the pump as the supply means to supply the solid-liquid mixture under weak and appropriate pressure (0.001 to 0.2 MPa), thereby suppressing the phenomenon of the "grater" from occurring, enabling the filtration on the entire surface of the screen facing the region H1 on the supply side and making it possible to use a wide filtration area efficiently. When the filtration area is wide, the filtration time for a prescribed amount of the solid-liquid mixture can be shortened to heighten the filtration ability and consequently the phenomenon of the "grater" is difficult to occur to thereby obtain a liquid component containing a small amount of minute solid components. That is to say, in the case of the soybean soup, the amount of the residue in soymilk becomes small. Since the pressure application by the pump enables the discharge window 8 to be urged in a fully closed direction by the pressure application lid 9, it can effectively be utilized without leaking the liquid component from the discharge window 8. That is to say, it is preferred that both the pressure application supply by the pump and the pressure application lid are used in conjunction with each other. In the case where the aperture is retained with a fixed plate in the absence of the pressure application lid, the internal pressure is apt to fluctuate depending on the degree of pressure application by the pump and the phenomenon of the "grater" occurs to produce a liquid component containing a great amount of minute solid components and, as the case may be, there is a possibility of the solid-liquid mixture passing through as it is to leak from the discharge outlet. The same results will be brought about when the pressure application by the pump is much stronger than the pushing pressure by the pressure application lid.

The soybean soup supplied to the rollers R1 and R2 is first filtered in the region H1 on the supply side under small pressure by the pump pressure, then filtered in the portion closest to the paired rollers under slightly large pressure and directed toward the pressure application lid 9. However, it is brought to a strongly pressurized state at a portion (in the region on the discharge side) H2 defined by the upper and lower rollers, passageway between the scrapers and pressure application lid 9 and stepwise filtered (dehydrated and squeezed).

Here, a pipe K for taking out the liquid component has a structure capable of submerged filtration, in which a pipe K1 for taking out the liquid component from the upper roller R1 and a pipe K2 for taking out the liquid component from the lower roller R2 are connected to each other (FIG. 4) so that the position of the upper end of the pipe K (K1 and K2) is higher than the position of the height of the upper roller R1. That is to say, by configuring the pipe K so that deaeration can be attained either from the upper roller R1 or from the lower roller R2, it is possible to extract high-quality soymilk containing no foam and exhibiting no quality variation. Incidentally, as the pipe configuration, it is possible to adopt the configuration in which the liquid component is taken out from a lower side Ke similarly to the upper side of the pipe shown in FIG. 4.

Next, another example of a solid-liquid separator Z2 using a roller system according to the present embodiment is shown in FIG. 5, in which the tip portion 3a of the casing 3 is not provided, but passageways T1 and T2 are provided for allowing the solid-liquid mixture to run through the outer peripheries of the upper and lower rollers R1 and R2. This example particularly has effects of widening the filtration area to enhance the filtering efficiency, forming on the surface of the screen a thin layer of solid component serving as a filter aid, and suppressing minute solid components from being mixed via the screen into the liquid component. Incidentally, the scraper may be provided at any position on the outer peripheries of the pair of rollers R1 and R2.

Figure 7A:
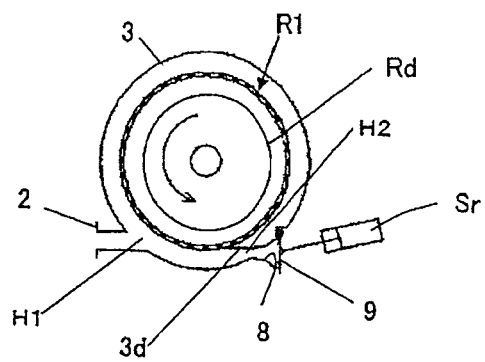
FIG. 7(a) is a diagram illustrating another example of each of the embodiments having a single roller, FIG. 7(b) a diagram illustrating still another example of each of the embodiments having three rollers, and FIG. 7(c) a diagram illustrating yet another example of each of the embodiments having four rollers.
Figure 7B:
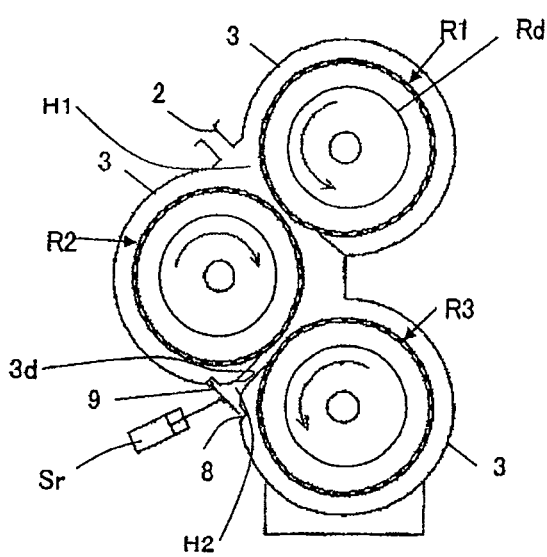
Figure 7C:
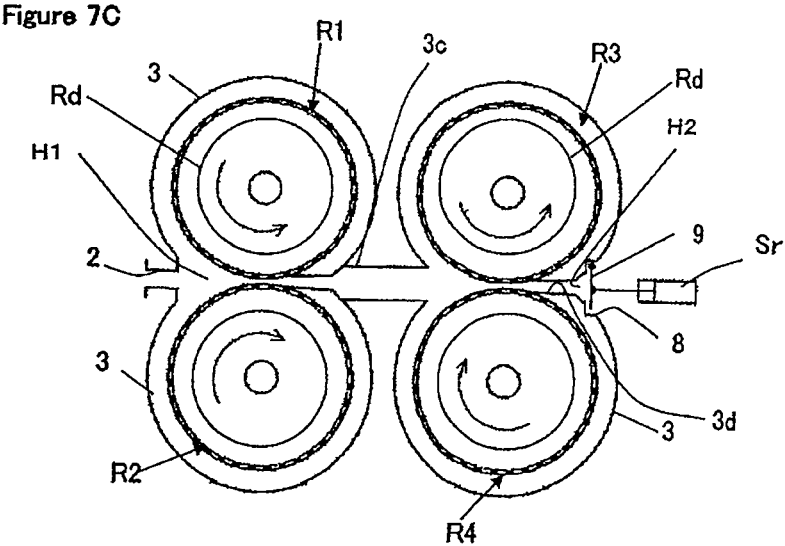

Examples of rollers to be disposed will be described. Also, in the case of a single roller R1 as shown in FIG. 7(a), it is possible to feed a solid-liquid mixture from the supply inlet 2 to the discharge window 8 via the roller R1. FIG. 7(b) shows a configuration in which three rollers R1 to R3 are disposed zigzag to supply the solid-liquid mixture from the supply inlet 2 between the rollers R1 and R2 disposed upward aslant, feed it to and discharge it from the discharge window 8 between the rollers R2 and R3 disposed downward aslant. The structure as shown in FIG. 7(c) is applicable, in which first paired rollers R1 and R2 and second paired rollers R3 and R4 are disposed and connected linearly to each other with a passageway 3c. In the examples shown in FIGS. 7(a) to 7(c), a prescribed wall 3d is provided in the vicinity of the discharge window 8 for directing the flow of the liquid component (this case has the advantage of heightening the pressure of the solid-liquid mixture in the region H2 on the discharge side). However, a scraper may be substituted for the prescribed wall 3d. In this case, it is also possible to secure the flow of the liquid component so as to go around in the direction of each of the rollers R1, R2, R3 and R4 (refer to reference symbol or numeral T2 in FIG. 5). In each of the examples shown in FIGS. 7(a) to 7(c), the casing 3 forms a wall made cylindrical around each of the rollers R1 to R4. Thus, it is possible to dispose the pair of upper and lower rollers, the pair of rollers in parallel (horizontally), plural rollers with their roller shafts disposed vertically and three or more rollers zigzag. Particularly, in the prescribed region (region on the discharge side) H2 in the pair of rollers closest to the discharge window 8, dehydration of the liquid component or squeezing of the solid component is finally performed.

Figure 8A:
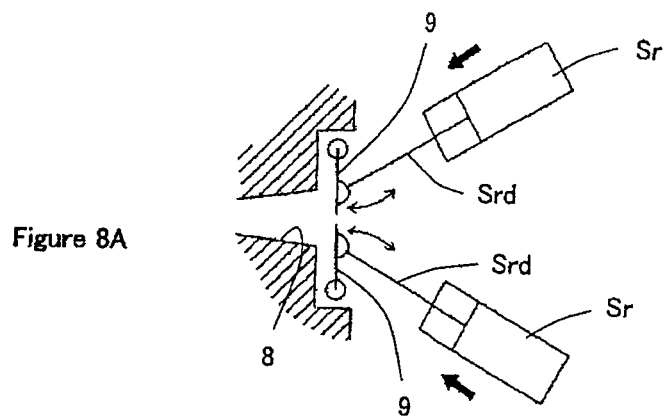
FIG. 8(a) is a diagram illustrating another example of each of the embodiments having a pressure application lid that opens right and left, FIG. 8(b) a diagram illustrating still another example of each embodiment having a pressure application lid to be linearly pushed forward, FIG. 8(c) a diagram illustrating yet another example of each embodiment having pressure application means using a spring, and FIG. 8(d) a diagram illustrating a further example of each embodiment having pressure application means having a weight.
Figure 8B:
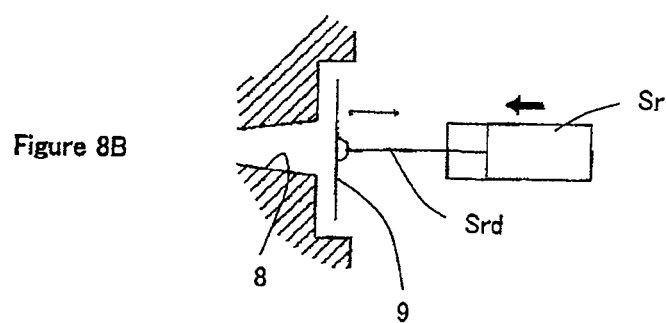
Figure 8C:
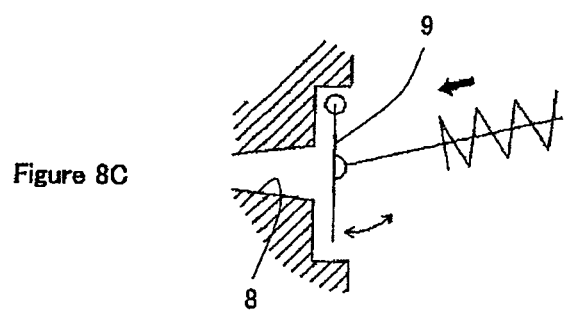
Figure 8D:
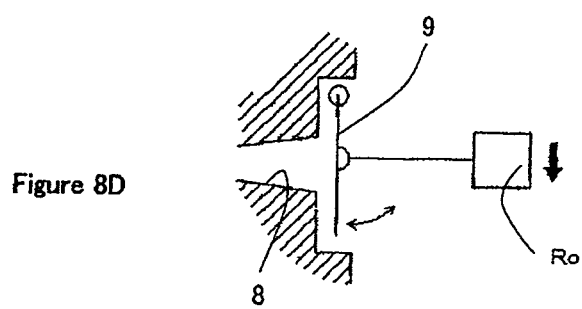

Examples of the pressure application lid 9 and air cylinder Sr that is the pressure application means will be described. As shown in FIG. 8(a), there are provided a pair of pressure application lids 9 to each of which a cylinder Sr that is the pressure application means is attached. The configuration shown in FIG. 8(b) is of a direct acting overriding type in which the center of the pressure application lid 9 is pressurized by the air cylinder so as to discharge the solid component from the outer periphery of the circular discharge window 8. Examples of the pressure application means include an oil pressure cylinder, a water pressure cylinder, a mere weight (reference symbol Ro in FIG. 8(d)) and a spring (FIG. 8(c)). Incidentally, as shown in FIGS. 8(a), 8(c) and 8(d), the cases of one side of the pressure application lid 9 movably fixed to the casing enable stable pressure application to be performed.

The inside drum Rd is attached to the roller shaft Rj of each of the rollers R1 and R2 (FIGS. 1, 2 and 3). The inside drum Rd is made of cylindrical stainless steel, attached to the roller shaft Rj and provided with no pore unlike the screen. The inside drum Rd prevents the soymilk (including residue or detergent) from retention in the rollers R1 and R2 and, at the same time, fulfills its function to effectively perform dehydration or squeezing of soymilk between itself and the screen Rs formed in the outer periphery thereof with a great number of pores c and to suppress foams from being generated. The inside drum Rd is provided at a forward position thereof with outlets 11 and 12. The outlets 11 and 12 are provided at the forward center of the cylindrical rollers R1 and R2. Therefore, the liquid component flows along the passageway Rc U-shaped in cross section and formed between the screen Rs and the inside drum Rd within the rollers R1 and R2 and sent out to the outlets 11 and 12. The inside drum Rd may be made of stainless steel and, in view of light weight, of synthetic resin or titanium. The shape of the inside drum Rd may be polygonal in cross section that includes a triangular column, rectangular column and hexagonal column or may be tapered to have the diameter thereof reduced gradually toward the forward side (outlets 11 and 12), thereby making the liquid component easy to flow toward the side of the outlets 11 and 12.

Figure 9A:
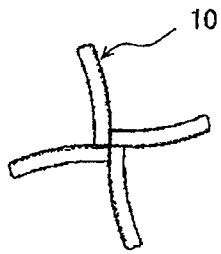
FIG. 9(a) is an explanatory view showing a paddle, FIG. 9(b) a cross section showing the structure of the roller according to each of the embodiments, and FIG. 9(c) an explanatory view showing another paddle.
Figure 9B:
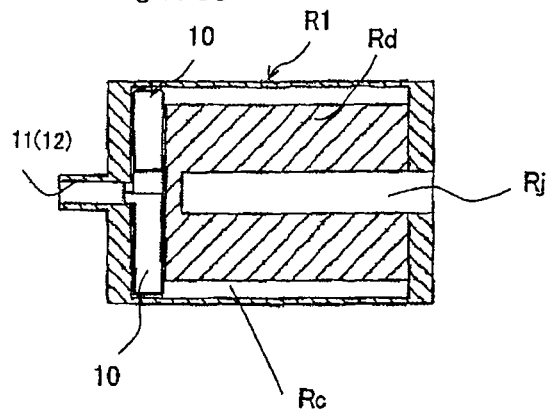
Figure 9C:
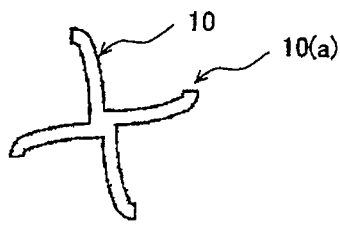
Figure 10:
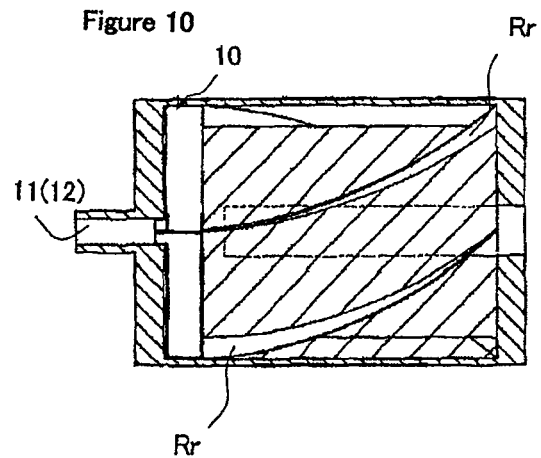
FIG. 10 is a cross section illustrating the structure of the roller in each of the embodiments.

It is preferred that the inside drum is provided on the front end thereof with a paddle 10 (FIGS. 9 and 10). Since the soymilk separated is successively flowing in the rollers R1 and R2, the soymilk in the rollers R1 and R2 is discharged from the outlet 11 as being extruded. At the time of the termination of the operation, however, the soymilk cannot be extruded. While the upper half of the soymilk in the rollers R1 and R2 is discharged from the outlets 11 and 12 via the lower side Ke of the pipe K opened, the lower half of the soymilk is kept remaining in the rollers R1 and R2. In order to discharge the soymilk, though in a small amount, attachment of paddles 10 is effective. To be specific, by attaching plural paddles 10 to the passageway Rc U-shaped in cross section for the liquid component on the forward side of the roller R1 (to the head of the inside drum Rd), when the roller R1 is rotated, the fixed paddles 10 are rotated at the same peripheral speed. Each paddle 10 has a length reaching the length of the passageway Rc U-shaped in cross section for the liquid component and has a tip shape 10a formed preferably in a bent shape for easily scooping up the soymilk (FIG. 9(c)). As a result, the remaining soymilk can be discharged from the outlet 11 as being continuously scooped up with the paddles 10. Likewise, the same effect can be obtained for the roller R2 as well.

In order for the soymilk to be scooped up and sent out to the outlets 11 and 12, as shown in FIG. 10, the inside drum Rd is preferably provided on the outer peripheral wall thereof with paddles Rr or inversely in the outer peripheral wall thereof with a groove (not shown). Otherwise, the formation of a concavo-convex peripheral wall combining the two will suffice. The paddles 10 may be attached to the roller shafts Rj of the rollers R1 and R2. That is to say, the paddles 10 may be attached rotatably to the leading end of the roller shaft Rj passing through the inside drum Rd and projecting forward.

FIG. 6 is a cross section showing a solid-liquid separator Z3 having a roller system according to the second embodiment of the present invention. In the present embodiment, paired scrapers 6 are attached as directed to the upper and lower rollers R1 and R2, respectively. That is to say, unlike the solid-liquid separator Z2 having the roller system, the passageway T1 and T2 are not provided here. The paired scrapers 6 are disposed to guide, without any modification, the solid-liquid mixture that has been supplied and passed between the upper and lower rollers R1 and R2 in the direction of the discharge window 8. That is to say, a region H2 on the discharge side is defined by the upper and lower rollers R1 and R2, the upper and lower scrapers 6 and a pressure application lid 9 on the wall of a casing 3 that is disposed close to the scrapers. It is possible for the upper and lower scrapers 6 to be attached as being spread in proportion as the scrapers are directed toward the discharge window 8. In this configuration, it is possible to avoid a cake (solid component) from retention in the passageway between the scrapers to eliminate a state unable to continue the operation (closed state). Since the friction resistance of the solid component relative to the scrapers is small, the solid component smoothly flows to expect the enhancement of the effect of the treatment ability. Even when the pressure applied by the pressure application lid 9 is comparatively weak, since the discharge outlet departs from the scrapers, re-absorption of the liquid component is difficult to perform to easily obtain a solid component having a small water content ratio and a liquid component containing a small amount of minute solid components (the so-called phenomenon of the "grater" is hard to occur).

In addition, a region H1 on the supply side is set to be larger than the region H2 on the discharge side. In comparison with the first embodiment, therefore, the solid-liquid mixture to be supplied from the region H1 on the supply side can readily pass through the region H2 on the discharge side to allow the solid component in a half-extracted state to readily pass in synchronization with the rotation of the rollers. For this reason, the extraction time can be shortened to enhance the apparatus performance, make the phenomenon of the solid substance rubbing the surface of the screens on the rollers (the so-called "grater" phenomenon) hard to occur and enable the liquid component (soymilk) containing a small amount of minute solid substances (residues in the soymilk, for example) to be obtained. In addition, when the cross-sectional area of the solid substance to be discharged becomes large, the solid substance always filling the region H2 on the discharge side causes the entire discharge pressure of the discharge window 8 to become large and, therefore, there is no case where the force pressing the discharge window 8 becomes insufficient. In other words, even when the pressure of the discharge window 8 is made small, the internal pressure can be heightened and, in addition, the fine adjustment of the internal pressure, i.e. adjustment of extraction, can easily be performed.

According to the present embodiment, therefore, the solid-liquid mixture sent under pressure between the upper and lower rollers is primarily extracted in the region H1 on the supply side, secondarily extracted between the upper and lower rollers, receives the propulsive force toward the discharge window 8 by means of the rotation force of the rollers, passes the upper and lower rollers and passageway (between the scrapers 6 (scraper passageway), is subjected to tertiary extraction in the region H2 on the discharge side and discharged from the gap between the pressure application lid 9 and the discharge window 8. As a result, the solid-liquid mixture is conveyed in a straight stream from a supply inlet 2 and strongly pushes the pressure application lid 9. However, the water content ratio of the solid substance by this pushing force can be adjusted through the adjustment of the pressure applied by an air cylinder Sr.

Here, as the disposition of the pair of rollers R1 and R2, it is possible to adopt not only the vertical disposition, but also lateral disposition. In the case of the lateral disposition of the rollers, as shown in Citation 3, the cylindrical upper and lower faces are directed in the lateral direction and, when the solid-liquid mixture has been supplied from the upper side, it may fall down spontaneously (by gravity) between the pair of rollers R1 and R2. It is also possible that the cylindrical upper and lower faces are directed to the upper and lower ends (the roller shafts are directed longitudinally, vertically or slightly aslant).

Next, the description will be made with respect to the embodiment of the present invention in comparison with Citation 3.

Citation 3 adopts a configuration of extraction performed under locally high internal pressure at a deep position close to the screen to obtain a liquid component containing a large amount of minute solid components and, since re-absorption of the liquid component is likely to occur when the internal pressure has immediately been reduced (the internal pressure has to be increased more than necessary), it is difficult to make the solid component and liquid component and the qualities thereof homogeneous. To the contrary, in the solid-liquid separator using the roller system according to the embodiment of the present invention, since constant pressure can be exerted onto the discharge window with the pressure application means, it is possible to perform dehydration and squeezing so that the solid component and liquid component are made homogeneous. In addition, since the discharge window departs from the screen of the roller and since the liquid component cannot be re-absorbed, the minimum necessary internal pressure will suffice. For this reason, the service life of the apparatus is prolonged, the ability can be induced, and the amount of the residue to be contained is small. In addition, since the volume of the region H2 on the discharge side is comparatively larger to enable extraction under weak internal pressure making use of the elasticity of the solid component, the phenomenon of the "grater" occurring otherwise on the surface of the screen does seldom occur to enable ready acquisition of a liquid component containing a small amount of minute solid components.

Citation 3, though not described therein but assumed from FIG. 1 thereof, makes the air retained inside the rollers difficult to deaerate and, in the case of the treated liquid containing fine air like soybean soup, forms a state in which the air is always supplied to the inside of the rollers and retained therein. In addition, it is conceivable from FIG. 1 of Citation 3 that the outside of the rollers is exposed to the air when the upper side contains a small amount of the liquid to be treated and that the skin of soybean milk is formed to readily induce clogging. Since it is also assumable from FIG. 1 of Citation 3 that the supply pressure of the liquid to be treated utilizes the specific gravity to be small, there is no reproduction means capable of extruding the substances with which the pores of the screen have been clogged when the clogging has been induced. To the contrary, the solid-liquid separator using the roller system according to the embodiment of the present invention has a structure in which the pump is used as the supply means to bring the rollers into no direct contact with the air, allows no air layer to exist on either surface of the rollers (screens) and enables the retained air to be discharged along with the liquid component by means of the inside drum. Therefore, the skin of soybean milk is hard to form and, even when clogging has been induced, the clogging substances can be sent out under pressure with the pump. Thus, the present invention has the advantage of clogging being hard to induce.

Citation 3, though not described therein but assumed from FIG. 1 thereof, supplies the solid-liquid mixture to the apparatus using its own weight, only utilizes the falling difference to discharge the liquid component from the apparatus and requires a next-step apparatus to be disposed below an outlet pipe and, since the pressure for extruding the solid component depends only on the rotation force of the rollers, it can be estimated that the "grater" phenomenon is likely to occur. Also in Citation 3, there is no description concerning the fact that a pump is used to supply a solid-liquid mixture and the effect of using the pump in conjunction with a lid body. On the other hand, in the embodiment of the present invention, since the feed pump is used to supply the solid-liquid mixture under small pressure between the upper and lower rollers, the filtration surface on the rollers is wide and can effectively be made use of to enhance the filtration ability and add the rotation force of the rollers, thereby extruding the solid component toward the discharge outlet. In addition, the separated liquid component can be sent out to a higher position in the presence of the pump pressure. Therefore, there is no restriction on the height of an apparatus to be used at a next step. In addition, since a rising pipe can be used midway a next delivery step after the separation operation using no defoaming agent in the case of the foamable solid-liquid mixture, a foam-suppressing action can be expected. Furthermore, the position of the upper end of the pipe K2 from the lower roller. R2 is higher than the position of the height of the upper roller R1 to perform submerged filtration and, therefore, the foam-suppressing action can be expected.

In Citation 3, the spring 52 and lid body 53 are provided at positions deep in the lower side of the right and left rollers in the direction of closing the discharge outlet 51. On the other hand, in the embodiment of the present invention, since the upper and lower rollers R1 and R2 are disposed and since the cylinder Sr and scrapers 6 are disposed sideways, the attachment and adjustment of these parts can be performed with ease. Also in the cleaning operation, cleaning can be performed in the embodiment of the present invention in a state in which the discharge window has been opened with the cylinder Sr.

Since Citation 3 adopts the configuration in which the scraper is disposed on the beneath side to make the attachment and adjustment thereof difficult to perform. That is to say, since the lid body 53 of Citation 3 is disposed at a deep position on the lower side of the apparatus and is hard to visually confirm, adjustment, fully closing and cleaning operations are difficult to perform. On the other hand, in the embodiment of the present invention, since the upper and lower rollers R1 and R2 are disposed and since the cylinder Sr and scrapers 6 are disposed sideways, attachment and adjustment of the parts are easy to conduct while visually confirming the parts and it is easy to perform the fully closing and cleaning operations.

As has been described in the foregoing, each of the embodiments has been illustrated citing the case where soymilk is produced. However, the embodiments are not limited to the production of tofu and fried bean curd, but can be applied to a wide variety of applications including sludge treatment and foodstuff residue treatment. Furthermore, though each of the embodiments of the present invention has been described with respect to the submerged filtration structure, the present invention is applicable to any other structures than the submerged filtration structure.

What is claimed is:

1. A solid-liquid separator using a roller system, comprising:
  a casing; a base;
  a first roller and a second roller disposed vertically to each other with respect to the base in the casing and at least one of the first roller and the second roller including a screen having a plurality of pores formed in an outer periphery of the at least one of the first roller and the second roller;
  a pump disposed outside the first roller and the second roller for supplying a solid-liquid mixture into the casing under a predetermined pressure, wherein the solid-liquid mixture is separated into a solid component via the plurality of pores of the screen and a liquid component filtered into the at least one of the first roller and the second roller through the screen;
  a discharge window formed on the casing and adjacent to the first roller and the second roller in a downstream side with respect to the first roller and the second roller for discharging the solid component;
  a pressure application lid formed on the casing;
  a cylinder applying a prescribed pressure to the pressure application lid in a direction of closing the discharge window; and
  a constant pressure adjuster adjusting the prescribed pressure applied from the cylinder by a constant pressure control,
  wherein the liquid component is discharged from a flow passage formed on the at least one of the first roller and the second roller,
  the solid component is discharged from the discharge window while the prescribed pressure is applied to the pressure application lid by the cylinder so that the discharge window is pressurized over the pressure application lid,
  a wall of the casing is formed in an arc shape along a circumferential shape of the first roller and the second roller, and
  the discharge window is formed on the wall of the casing disposed between the first roller and the second roller.

2. A solid-liquid separator using a roller system according to claim 1, wherein the solid-liquid mixture comprises soybean soup, the solid component comprises okara and the liquid component comprises soymilk.

* * * * *